US011877122B2

(12) United States Patent
Huang

(10) Patent No.: US 11,877,122 B2
(45) Date of Patent: Jan. 16, 2024

(54) HEARING AID WITH WIRELESS TRANSMISSION FUNCTION

(71) Applicant: Zhengdong Huang, Yancheng (CN)

(72) Inventor: Zhengdong Huang, Yancheng (CN)

( * ) Notice: Subject to any disclaimer, the term of this patent is extended or adjusted under 35 U.S.C. 154(b) by 149 days.

(21) Appl. No.: 17/609,009

(22) PCT Filed: Jan. 21, 2020

(86) PCT No.: PCT/CN2020/073647
§ 371 (c)(1),
(2) Date: Nov. 5, 2021

(87) PCT Pub. No.: WO2020/238274
PCT Pub. Date: Dec. 3, 2020

(65) Prior Publication Data

US 2022/0217475 A1 Jul. 7, 2022

(30) Foreign Application Priority Data

May 27, 2019 (CN) ........................ 201910444096.3

(51) Int. Cl.
*H04R 25/00* (2006.01)

(52) U.S. Cl.
CPC ........... *H04R 25/50* (2013.01); *H04R 25/554* (2013.01); *H04R 2225/43* (2013.01); *H04R 2410/00* (2013.01); *H04R 2420/07* (2013.01)

(58) Field of Classification Search
CPC ............ H04R 2225/43; H04R 2410/00; H04R 2420/07; H04R 25/50; H04R 25/554
(Continued)

(56) References Cited

U.S. PATENT DOCUMENTS 10,575,106 B1 * 2/2020 Bergmann ........... H04R 25/505
2015/0172831 A1 6/2015 Dittberner et al.
2017/0347207 A1 11/2017 De Haan et al.

FOREIGN PATENT DOCUMENTS

CN 104869517 A 8/2015
CN 107864441 A 3/2018
(Continued)

OTHER PUBLICATIONS

International Search Report issued in corresponding International application No. PCT/CN2020/073647, dated Apr. 17, 2020.
(Continued)

*Primary Examiner* — Phylesha Dabney

(57) ABSTRACT

A hearing aid with wireless transmission function is disclosed, comprising a microphone for receiving an ambient sound and outputting it to an audio processing and hearing compensation module; the audio processing and hearing compensation module for processing the sound, amplifying and compressing the sound according to preset hearing compensation parameters, and outputting a processed sound signal to a sound generator (a loudspeaker); and functional control keys for adjusting land controlling various functions, such as adjusting volume, selecting listening program, answering phone, and turning on/off the disclosed. The audio processing and hearing compensation module of the disclosed processes and adjusts the sound according to preset hearing compensation parameters, an audio wireless transmission module is connected and fitted with an audio signal input end of the audio, processing and hearing compensation module, thereby replacing a complicated wired programming manner, realizing wireless fitting and greatly facilitating use by elderly users and hearing-impaired persons.

6 Claims, 1 Drawing Sheet

(58) Field of Classification Search
USPC .......................................................... 381/312
See application file for complete search history.

(56) References Cited

FOREIGN PATENT DOCUMENTS

| | | | |
|---|---|---|---|
| CN | 208094796 | U | 11/2018 |
| CN | 110191406 | A | 8/2019 |

OTHER PUBLICATIONS

Written Opinion of the International Search Authority in corresponding International application No. PCT/CN2020/073647.

* cited by examiner

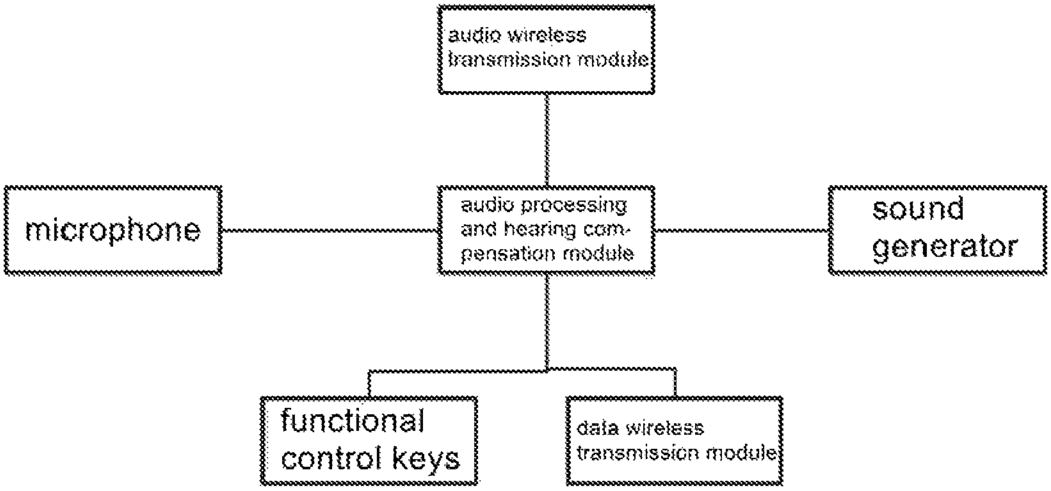
audio wireless transmission module
microphone
audio processing and hearing com-pensation module
sound generator
functional control keys
data wireless transmission module

HEARING AID WITH WIRELESS TRANSMISSION FUNCTION

TECHNICAL FIELD

The present disclosure relates to the technical field of hearing aids, in particular to a hearing aid with wireless transmission function.

BACKGROUND

A hearing aid is a small speaker, which can amplify an original inaudible sound, and then send the amplified sound to the auditory center in the brain through a residual hearing of hearing impaired person to perceive the sound. The hearing aid is mainly composed of five parts: a microphone, an amplifier, an earphone, a power supply and a volume control. The hearing aids can be classified into an air conductive hearing aid and a bone conductive hearing aid according to conductive methods, while can be classified into a box type, a glasses type, a hairpin type, a behind-the-ear type, an in-ear type, an ear canal type, and a deep ear canal type according to using methods.

Traditional analog hearing aids have been replaced by digital hearing aids; however, the digital hearing aids require a complete set of fitting procedures to obtain the best hearing compensations and listening experiences. A programming interface is provided on the digital hearing aid, and then is connected with an external fitting device through a connecting wire, so as to realize a purpose of fitting. But this kind of physical interface will also bring reliability problem, the complexities of the volume and structure of the hearing aid are increased, and the wireless fitting cannot be realized, which is inconvenient for the elderly users and hearing impaired the persons to use. Moreover, the traditional digital hearing aids can only amplify and compensate the sounds for hearings, but cannot make calls and listen to music. Thus, a hearing aid with wireless transmission function is provided hereon.

SUMMARY

The present disclosure provides a hearing aid with wireless transmission function, which has the advantages of realizing wireless fitting and facilitating use by elderly users and the hearing impaired persons, and can solve the problems mentioned in the prior art.

A hearing aid with wireless transmission function is provided to achieve the above purposes, which comprises:

a microphone for receiving an ambient sound and outputting the ambient sound to an audio processing and hearing compensation module;

the audio processing and hearing compensation module for processing the sound, and amplifying and compressing the sound according to preset hearing compensation parameters, and then outputting a processed sound signal to a sound generator (a loudspeaker);

functional control keys for adjusting and controlling various functions, such as adjusting volume, selecting listening program, answering phone, and turning on/off the hearing aid;

the sound generator (the loudspeaker) for converting a processed sound electrical signal into sounds;

a data wireless transmission module, which is built in the hearing aid and connected to a programming interface of the audio processing hearing compensation module, wherein after receiving data and instructions, the data wireless transmission module programs the audio processing hearing compensation module through the programming interface, and mainly transmits various data in a wireless manner; and an audio wireless transmission module, which is built in the hearing aid and connected to an audio signal input end of the audio processing hearing compensation module, and is mainly used for transmitting various audio signals in a wireless manner, such as answering call, listening to music, listening to TV audio, meeting, language training, and etc.

Optionally, the preset hearing compensation parameters in the audio processing and hearing compensation module are mainly divided into three ranges, namely, a moderate hearing loss compensation (45 dB to 60 dBHL), a severe hearing loss compensation (60 dB to 90 dBHL) and an extremely severe hearing loss compensation (more than 90 dBHL).

Optionally, when the audio wireless transmission module receives an audio wireless signal, the microphone of the hearing aid will be automatically switched to a phone mode; when the transmission of the audio wireless signal is ended, the microphone is switched to a hearing aid mode.

Optionally, compensation volumes in the audio processing and hearing compensation module is adjusted by hearing impaired persons through a volume adjustment button in the functional control keys, so as to select listening programs and volume levels corresponding to the hearing impaired persons.

Optionally, the data wireless transmission module is connected to a cloud platform through a computer or mobile phone (APP) fitting software, and then audio processing and hearing compensation data on a device is transmitted to the cloud platform and saved, so that the hearing aid worn by the same hearing impaired person can be used directly after being turned on. The audio processing and hearing compensation module automatically predicts and adjusts the volume of the hearing aid worn by the same hearing impaired person in a later stage according to the changes of the audio processing and hearing compensation data during a long-term use by the same hearing impaired person. Meanwhile, the hearing impaired persons can also manually adjust according to their own sensations.

The present disclosure provides a hearing aid with wireless transmission function, which has the following beneficial effects:

In the hearing aid with wireless transmission function, the audio processing and hearing compensation module processes the sound and adjusts the sound according to preset hearing compensation parameters, and the audio wireless transmission module is connected and fitted with the audio signal input end of the audio processing and hearing compensation module, thereby replacing a complicated wired programming manner, realizing wireless fitting and greatly facilitating use by elderly users and the hearing impaired persons.

In the hearing aid with wireless transmission function, various functions are adjusted and controlled through the functional control buttons; such as: adjusting volume, selecting listening program, answering call, connecting and matching with Bluetooth for playing music. Compared to the traditional digital hearing aid, which can only amplify and process sounds, and compensate the sounds for hearings, but cannot make calls and listen to music, the hearing aid with wireless transmission function according to the present disclosure can transmit the audio signals, so that the hearing impaired persons can enjoy the fun of the multimedia while obtaining the hearing compensations.

BRIEF DESCRIPTION OF THE DRAWINGS

FIG. 1 is a schematic view of a hearing aid with wireless transmission function according to the present disclosure.

DETAILED DESCRIPTION OF PREFERRED EMBODIMENTS

The technical solutions in the embodiments of the present disclosure will be clearly and completely described hereafter in conjunction with the accompanying drawings in the embodiments of the present disclosure. Obviously, the described embodiments are merely a part of the embodiments of the present disclosure, rather than all the embodiments. Based on the embodiments of the present disclosure, all other embodiments obtained by those of ordinary skill in the art without creative work shall fall within the protection scope of the present disclosure.

Embodiment 1 provides a hearing aid with wireless transmission function, comprising:

- a microphone for receiving an ambient sound and outputting the ambient sound to an audio processing and hearing compensation module;
- the audio processing and hearing compensation module for processing the sound, amplifying and compressing the sound according to preset hearing compensation parameters, and then outputting a processed sound signal to a sound generator (a loudspeaker); wherein the audio processing and hearing compensation module processes the sound, and adjust the sound according to preset hearing compensation parameters, and an audio wireless transmission module is connected to an audio signal input end of the audio processing and hearing compensation module for the audio processing and hearing compensation module to proceed with fitting.
- functional control keys for adjusting and controlling various functions, such as adjusting volume, selecting listening program, answering phone, and turning on/off the hearing aid;
- the sound generator (the loudspeaker) for converting a processed sound electrical signal into sounds;
- a data wireless transmission module, which is built in the hearing aid and connected to a programming interface of the audio processing hearing compensation module, wherein after receiving data and instructions, the data wireless transmission module programs the audio processing hearing compensation module through the programming interface, and mainly transmits various data in a wireless manner; and
- the audio wireless transmission module, which is built in the hearing aid and connected to an audio signal input end of the audio processing hearing compensation module, and is mainly used for transmitting various audio signals in a wireless manner, such as answering call, listening to music, listening to TV audio, meeting, language training, and etc., wherein various functions are adjusted and controlled through the functional control buttons; such as: adjusting volume, selecting listening program, answering call, connecting and matching with Bluetooth for playing music, so that the hearing impaired persons can enjoy the fun of the multimedia while obtaining the hearing compensations.

The preset hearing compensation parameters in the audio processing and hearing compensation module are mainly divided into three ranges, namely, a moderate hearing loss compensation (45 dB to 60 dBHL), a severe hearing loss compensation (60 dB to 90 dBHL) and an extremely severe hearing loss compensation (more than 90 dBHL).

When the audio wireless transmission module receives an audio wireless signal, the microphone of the hearing aid will be automatically switched to a phone mode; when the transmission of the audio wireless signal is ended, the microphone is switched to a hearing aid mode.

Compensation volumes in the audio processing and hearing compensation module is adjusted by hearing impaired persons through a volume adjustment button within the functional control keys, so as to select listening programs and volume levels corresponding to the hearing impaired persons.

The data wireless transmission module is connected to a cloud platform through a computer or mobile phone (APP) fitting software, and then audio processing hearing compensation data on a device is transmitted to the cloud platform and saved, so that the hearing aid worn by the same hearing impaired person can be used directly after being turned on. The audio processing and hearing compensation module automatically predicts and adjusts the volume of the hearing aid worn by the same hearing impaired person in a later stage according to the changes of the audio processing and hearing compensation data during a long-term use by the same hearing impaired person. Meanwhile, the hearing impaired persons can also manually adjust according to their own sensations.

Embodiment 2 is different from Embodiment 1 in that: the data wireless transmission module and the audio wireless transmission module can be built into a digital chip within the audio processing and hearing compensation module, or can be respectively built into the hearing aid independently. Aiming at different hearing impaired persons, the maximum output, compensation gain, compression ratio, and start-up release time can be adjusted accordingly, so the circuit has better stability with fewer components and circuit solder joints, the mechanical adjustment is reduced, the installation space is saved, and the man-made adjusting operation error is reduced. The data wireless transmission module and audio wireless transmission module are located within the hearing aid, which is beneficial for preventing moisture and dusts.

Embodiment 3 is different from Embodiment 1 and Embodiment 2 in that: a wireless transmission manner is a 2.4G Bluetooth transmission manner. The 2.4G digital wireless transmission technology is utilized, so excellent anti-interference performance is provided, which can effectively shield interference of multiple wireless devices, such as common cordless phones, mobile phones, walkie-talkies, and so on, allowing users to obtain the clear high-fidelity wireless audio. However, the characteristics of wireless products determine that this module cannot avoid the interference at the same frequency. Therefore, when meeting such kind of interference source, the simpler solution is to change a channel and select a channel with different interference frequencies to work, or to select any other wireless transmission methods.

Operation steps: the user first turns on the hearing aid and sends a connection instruction to the hearing aid through a wireless transmitter on a computer terminal or mobile phone terminal (APP); after the connection is successful, the fitting software on the computer terminal or mobile phone terminal (APP) reads or sends out various data and instructions to the hearing aid. After receiving the data and instructions, the data wireless transmission module programs the audio processing hearing compensation module through the programming interface, then the audio processing hearing compensation data on the device is transmitted to the cloud platform and saved. Finally, the user can perform audition according to the volume that is not preset within the hearing aid, if the audition is not ideal, the user can adjust the volume according to the volume adjustment button in the functional control keys.

It should be noted that, in the present disclosure, the relational terms such as first and second are only used to distinguish one from another entity or operation without necessarily requiring or implying any actual such relationship or order between such entities or operations. Besides, the terms "include", "comprise" or any other variants thereof are intended to cover non-exclusive inclusion, so that a process, method, article or device of including a series of elements not only includes those elements, but also includes other elements that are not explicitly listed, or also includes the elements inherent to the process, method, article or device.

Although the embodiments of the present disclosure have been illustrated and described, those of ordinary skill in the art should understand that various changes, modifications, substitutions and variations can be made to these embodiments without departing from the principles and spirits of the present disclosure, and the scope of the present disclosure is defined by the append portioned claims and their equivalents.

What is claimed is:

1. A hearing aid with wireless transmission function, comprising:

a microphone for receiving an ambient sound and outputting the ambient sound to an audio processing and hearing compensation module;

the audio processing and hearing compensation module for processing the sound, amplifying and compressing the sound according to preset hearing compensation parameters, and then outputting a processed sound signal to a sound generator;

functional control keys for adjusting and controlling preset functions, which include any one of adjusting volume, selecting listening program, answering phone, and turning on/off the hearing aid;

the sound generator for converting a processed sound electrical signal into sounds;

a data wireless transmission module, which is built in the hearing aid and connected to a programming interface of the audio processing hearing compensation module, wherein after receiving data and instructions, the data wireless transmission module programs the audio processing hearing compensation module through the programming interface, and mainly transmits various data in a wireless manner;

an audio wireless transmission module, which is built in the hearing aid and connected to an audio signal input end of the audio processing hearing compensation module, and is used for transmitting various audio signals in a wireless manner, wherein when the audio wireless transmission module receives an audio wireless signal, the microphone of the hearing aid will be automatically switched to a phone mode when a transmission of the audio wireless signal is ended, the microphone is switched to a hearing aid mode.

2. The hearing aid with wireless transmission function according to claim 1, wherein the audio signals include any one of answering call, listening to music, listening to TV audio, meeting, language training.

3. The hearing aid with wireless transmission function according to claim 1, wherein the preset hearing compensation parameters in the audio processing and hearing compensation module are mainly divided into three ranges, namely, a moderate hearing loss compensation (45 dB to 60 dBHL), a severe hearing loss compensation (60 dB to 90 dBHL) and an extremely severe hearing loss compensation (more than 90 dBHL).

4. The hearing aid with wireless transmission function according to claim 1, wherein compensation volume in the audio processing and hearing compensation module is adjusted by hearing impaired persons through a volume adjustment button in the functional control keys, so as to select listening programs and volume levels corresponding to the hearing impaired persons.

5. The hearing aid with wireless transmission function according to claim 1, wherein both the data wireless transmission module and the audio wireless transmission module are configured inside the hearing aid.

6. The hearing aid with wireless transmission function according to claim 1, wherein the data wireless transmission module is connected to a cloud platform through smart devices, for transmitting audio processing and hearing compensation data to the cloud platform and saving.

* * * * *